(12) United States Patent
You et al.

(10) Patent No.: US 7,706,351 B2
(45) Date of Patent: Apr. 27, 2010

(54) APPARATUS AND METHOD FOR TRANSMITTING AN UPLINK SIGNAL IN A MOBILE COMMUNICATION SYSTEM USING AN OFDMA SCHEME

(75) Inventors: Cheol-Woo You, Seoul (KR); Eung-Sun Kim, Suwon-si (KR); Jong-Hyeuk Lee, Anyang-si (KR); Joo-Hwan Chun, Daejon (KR); Kyung-Chun Lee, Daejon (KR); Yung-Soo Kim, Seongam-si (KR)

(73) Assignees: Samsung Electronics Co., Ltd. (KR); Korea Advanced Institute of Science and Technology (KR)

( * ) Notice: Subject to any disclaimer, the term of this patent is extended or adjusted under 35 U.S.C. 154(b) by 586 days.

(21) Appl. No.: 11/703,266

(22) Filed: Feb. 7, 2007

(65) Prior Publication Data

US 2007/0206691 A1     Sep. 6, 2007

(30) Foreign Application Priority Data

Feb. 7, 2006   (KR) ...................... 10-2006-0011680

(51) Int. Cl.
*H04B 7/208* (2006.01)
(52) U.S. Cl. ..................... 370/344; 370/343; 375/267
(58) Field of Classification Search .................. None
See application file for complete search history.

(56) References Cited

U.S. PATENT DOCUMENTS

2005/0041750 A1   2/2005   Lau

FOREIGN PATENT DOCUMENTS

| EP | 1 109 328 | 6/2001 |
| FR | 2823623 | 10/2002 |
| KR | 1020050067331 | 7/2005 |
| WO | WO 02/084934 | 10/2002 |
| WO | WO 03/084097 | 10/2003 |

OTHER PUBLICATIONS

Nobilet et al., A Pre-Equalization Technique for Uplink MC-CDMA Systems Using TDD and FDD Modes, Vehicular Technology Conference Proceedings, Sep. 24, 2002, pp. 346-350.

*Primary Examiner*—Erika A Gary
(74) *Attorney, Agent, or Firm*—The Farrell Law Firm, LLP

(57) ABSTRACT

Disclosed is a method for transmitting an uplink signal by a mobile station in a mobile communication system using an OFDMA scheme. The method includes estimating a downlink channel status by using a signal received from a base station; determining a precoding matrix by using the estimated downlink channel status; and transmitting a signal obtained by multiplying an uplink signal to be transmitted by the precoding matrix to the base station.

8 Claims, 4 Drawing Sheets

APPARATUS AND METHOD FOR TRANSMITTING AN UPLINK SIGNAL IN A MOBILE COMMUNICATION SYSTEM USING AN OFDMA SCHEME

PRIORITY

This application claims priority under 35 U.S.C. §119(a) to an application filed in the Korean Industrial Property Office on Feb. 7, 2006 and assigned Serial No. 2006-11680, the contents of which are incorporated herein by reference.

BACKGROUND OF THE INVENTION

1. Field of the Invention

The present invention relates generally to a mobile communication system, and in particular, to an apparatus and a method for transmitting an uplink signal in a mobile communication system using an Orthogonal Frequency Division Multiple Access (OFDMA) scheme.

2. Description of the Related Art

In a $4^{th}$ generation (4G) communication system, which is the next generation communication system, there is ongoing research to provide users with services having various Qualities of Service ('QoS') and supporting a high speed transmission.

As a scheme useful for high speed data transmission in wire or wireless channels, an Orthogonal Frequency Division Multiplexing (OFDM) scheme is now being actively researched. The OFDM scheme, which transmits data using multiple carriers, is a special type of a Multiple Carrier Modulation (MCM) scheme in which a serial symbol sequence is converted into parallel symbol sequences and the parallel symbol sequences are modulated with a plurality of mutually orthogonal sub-carriers before being transmitted.

In order to provide a high-speed and high-quality data service to a Mobile Station (MS), a Base Station (BS) must select an optimum modulation and encoding scheme based on a wireless channel environment. The wireless channel environment is determined by a number of factors, such as white noise, frequency selective fading, shadowing, Doppler effect due to movement of the MS, Inter-Symbol Interference (ISI) due to delay spread, etc. Therefore, the BS must select a proper Modulation and Coding Scheme (MCS) in response to the wireless channel environment changing due to the factors described above. To this end, an exact channel estimation is required to precede such a selection. Understandably, it goes without saying that the MS also can perform the channel estimation.

A pilot signal is used for the channel estimation. Conventionally, a receiver performs channel estimation by interpolating a pilot signal transmitted from a transmitter. Therefore, the more pilot signals received during a unit time interval, the more exactly the receiver can estimate a channel.

On an assumption that the transmitter is a BS and the receiver is an MS in the OFDMA mobile communication system, the BS can transmit a plurality of pilot signals' to the MS in the entire frequency bands, and the MS can exactly estimate a downlink channel by using the plurality of received pilot signals. However, when the transmitter is an MS and the receiver is a BS, the MS transmits a pilot signal in a frequency band that does not overlap that of another MS, and the BS estimates an uplink channel by using the received pilot signal from the MS. Therefore, the number of uplink pilot signals is inevitably smaller than or equal to that of the downlink pilot signals, which degrades the performance throughput of the uplink channel estimation. If the number of the uplink pilot signals is increased in order to solve this problem, just as many data signals are inevitably reduced, thereby decreasing the entire throughput.

SUMMARY OF THE INVENTION

Accordingly, the present invention has been made to solve the above-mentioned problems occurring in the conventional art, and an object of the present invention is to provide an apparatus and a method for improving performance of an uplink channel estimation in a mobile communication system using an OFDMA scheme.

It is another object of the present invention to provide an apparatus and a method for increasing a system throughput in a mobile communication system using an OFDMA scheme.

In accordance with an aspect of the present invention, there is provided a method for transmitting an uplink signal by a mobile station in a mobile communication system using an Orthogonal Frequency Division Multiple Access (OFDMA) scheme. The method includes estimating a downlink channel state by using a signal received from a base station; determining a precoding matrix by using the estimated downlink channel state; and transmitting a signal obtained by multiplying an uplink signal to be transmitted by the precoding matrix to the base station.

In accordance with another aspect of the present invention, there is provided an apparatus for transmitting an uplink signal by a mobile station in a mobile communication system using an Orthogonal Frequency Division Multiple Access (OFDMA) scheme, the apparatus including a channel estimator for receiving a downlink signal from a base station, detecting a pilot signal from the received downlink signal, and estimating a downlink channel state by using the detected pilot signal; a precoding matrix determiner for determining a precoding matrix by using the estimated downlink channel state; and a precoder for transmitting a signal obtained by multiplying an uplink signal to be transmitted by the precoding matrix to the base station.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description, a detailed description of known functions and configurations incorporated herein will be omitted when it may make the subject matter of the present invention rather unclear.

The present invention provides an apparatus and a method, according to which an MS estimates a downlink channel, determines a precoding matrix by using the estimated downlink channel information, precodes an uplink signal by multiplying the precoding matrix and the uplink signal, and then transmits the precoded uplink signal, so that a BS can improve the uplink channel estimation performance and can increase the entire transmission throughput in a mobile communication system.

The present invention is based on an assumption that the uplink channel status and the downlink channel status do not change during a time interval in which an MS estimates a downlink channel, precodes an uplink signal by using the estimated downlink channel information, and then transmits the precoded uplink signal. Further, it is assumed that the performance of the downlink channel estimation using a large number of pilot signals is better than the performance of the uplink channel estimation using a small number of pilot signals.

Further, the present invention can be applied to an OFDMA mobile communication system that has divided frequency bands for use of multiple MSs. Further, the present invention can be applied to a Multiple Input Multiple Output (MIMO) mobile communication system using at least one transmission antenna and at least one reception antenna.

Figure 1:
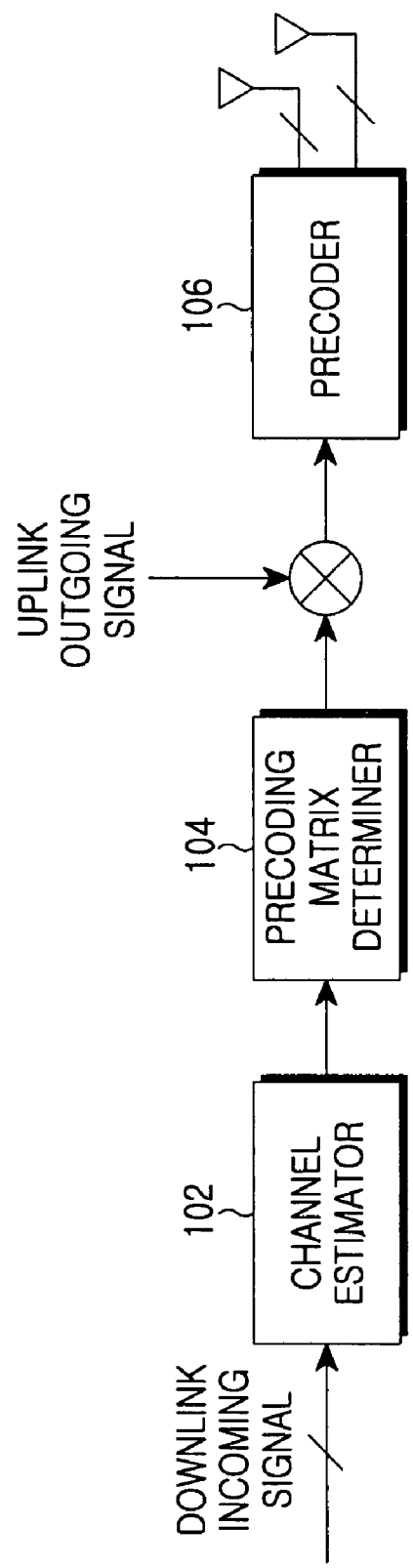
FIG. 1 is a block diagram illustrating an internal structure of a transmitter in a mobile communication system according to the present invention.

FIG. 1 is a block diagram illustrating an internal structure of a transmitter in a mobile communication system according to the present invention.

Referring to FIG. 1, the transmitter may be an MS for transmitting an uplink signal. The MS includes a channel estimator 102, a precoding matrix determiner 104, and a precoder 106.

The channel estimator 102 receives a downlink signal from a BS, and estimates a downlink channel status by detecting a pilot signal from the received downlink signal. In the downlink signal, the location of the pilot signal is information of which the MS is aware in advance.

The precoding matrix determiner 104 can estimate the uplink channel information estimated by the BS by using the estimated downlink channel information. It is because, as assumed above, the downlink channel status and the uplink channel status do not change according to time and the downlink channel estimation performance is better than the uplink channel estimation performance. Therefore, the precoding matrix determiner 104 multiplies an uplink signal to be transmitted by a predetermined precoding matrix vector, subtracts a product of the multiplication from an uplink channel estimation value, and determines a vector corresponding to a minimum value from among values obtained from the subtraction as the precoding matrix vector. This will be described below in further detail with reference to Equation (1) below.

The precoder 106 receives a signal obtained by multiplying the uplink signal by the precoding matrix vector determined by the precoding matrix determiner 104, precodes the signal, and then outputs the precoded signal.

Figure 2:
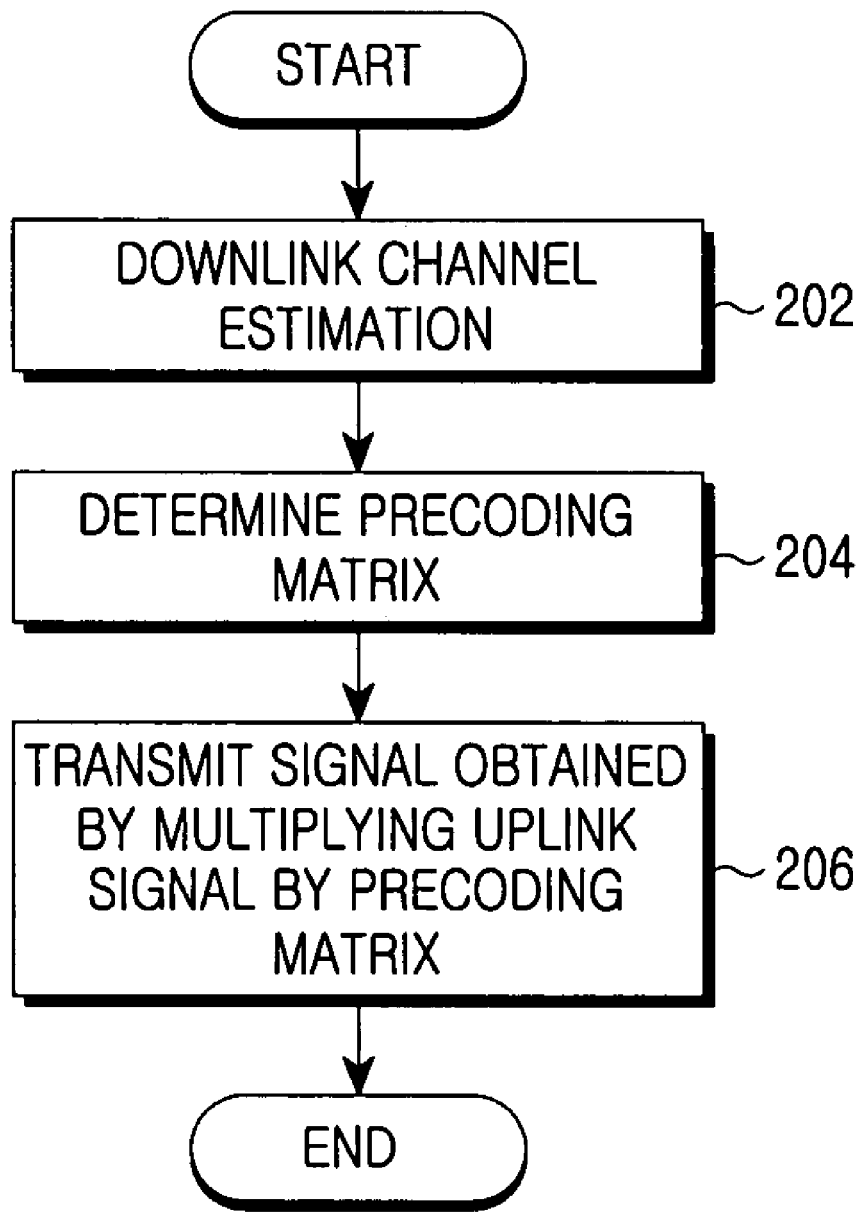
FIG. 2 is a flow chart illustrating a process in which a Mobile Station (MS) precodes and transmits an uplink signal in a mobile communication system according to the present invention.

FIG. 2 is a flow chart illustrating a process in which an MS precodes and transmits an uplink signal in a mobile communication system according to the present invention.

Referring to FIG. 2, first in step 202, the MS receives a downlink signal including a pilot signal from a BS, and performs downlink channel estimation by using the pilot signal. The downlink channel estimation may be performed through various channel estimation methods including the interpolation method, which will not be explained in further detail because they do not relate to the main idea of the present invention.

Then, the MS determines the precoding matrix by using the channel-estimated downlink channel status information in step 204 and then proceeds to step 206. At this time, the MS can be aware of the uplink channel status, because it is assumed that the downlink channel status is the same as the uplink channel status. Therefore, when transmitting an uplink signal, the MS can know the status in which the BS will receive the signal. Equation (1) below defines the precoding matrix.

$$\min\|\hat{H}_k - H_k W_k\|_F^2 \quad (1)$$

In Equation (1), $\hat{H}_k$ denotes an uplink channel estimation value corresponding to the $k^{th}$ sub-carrier, and $H_k$ denotes a downlink channel estimation value corresponding to the $k^{th}$ sub-carrier. Further, $W_k$ denotes a precoding matrix to be determined. F refers to Frobenius norm, and a square of the Frobenius norm refers to the total of the squares of all elements of the matrix.

In an OFDMA communication system to which the present invention can be applied, because one pilot signal sub-carrier including channel information is transmitted each time before or after transmission of multiple data sub-carriers, there may be a channel estimation error. Since the precoding matrix is applied to each sub-carrier, it is possible to reduce the channel estimation error by using the precoding matrix.

Meanwhile, $\hat{H}_k$ is determined by the downlink channel estimation value, the uplink pilot pattern, and the channel estimation algorithm. That is, because the MS knows the uplink pilot signal location and the channel estimation algorithm in advance, the MS can estimate the uplink channel status. Therefore, even when the BS does not report $\hat{H}_k$ to the MS, the MS can calculate and estimate $\hat{H}_k$ by itself.

That is, if the MS knows the downlink channel estimation value $\hat{H}_k$ and the precoding matrix $W_k$ of the downlink channel, the MS can minimize the channel estimation error by selecting the channel estimation matrix $\hat{H}_k$ having a lowest Mean Square Error (MSE) in $H_k \times W_k$, which is exact information of the uplink channel.

As described above, Equation (1) is used to determine a precoding matrix having a minimum square of Frobenius norm, which is a difference between the uplink channel estimation value $\hat{H}_k$ and a product of multiplication $H_k \times W_k$ of the downlink channel estimation value and the preceding matrix.

Then, in step 206, the MS multiplies $W_k$ satisfying Equation (1) by the uplink signal to be transmitted, and transmits the product signal of the multiplication to the BS.

The result of the uplink channel estimation using the received uplink signal from the MS by the BS is the same as the uplink channel estimation value $\hat{H}_k$ by the MS. That is, according to the present invention, the MS determines the preceding matrix $\hat{H}_k$, at which the BS inevitably estimates the uplink channel. Then, the MS multiplies a transmission signal vector by the determined precoding matrix and then transmits a product signal obtained from the multiplication. The reason why the MS measures the downlink channel status and uses the measured information in transmitting the uplink pilot signal instead of feeding back the measured information to the BS is that using the pilot signal is more efficient in view of the overhead than feed back the measured information. Of course, the MS can feed back the measured downlink channel status information to the BS, as obvious to one skilled in the art.

Meanwhile, if there is no power limitation condition in determining $W_k$ in Equation (1), $W_k$ can be defined by Equation (2) below.

$$W_k = (H_k^H H_k)^{-1} H_k^H \hat{H}_k \quad (2)$$

In contrast, if there is a power limitation condition in determining $W_k$ in Equation (1), $W_k$ can be defined by Equation (3) below.

$$W_k = (H_k^H H_k + \lambda I)^{-1} H_k^H \hat{H}_k \quad (3)$$

In Equation (3), $\lambda$ refers to a value satisfying the power limitation condition $\|W_k\|_F^2 = P$ (Newton's method). In Equations (2) and (3), the superscript H denotes a Hermitian matrix. When there is no power limitation condition as in Equation (2), the precoding matrix of the downlink channel corresponds to a value obtained by simply multiplying a matrix obtained through zero-forcing of the uplink channel by the uplink channel, and thus allows a large channel estimation error. However, when there is a power limitation condition as in Equation (3), because the precoding matrix corresponds to a value reflecting even the dispersion of the noise of the downlink channel, it is possible to obtain a more exact precoding matrix through the channel estimation.

Figure 3:
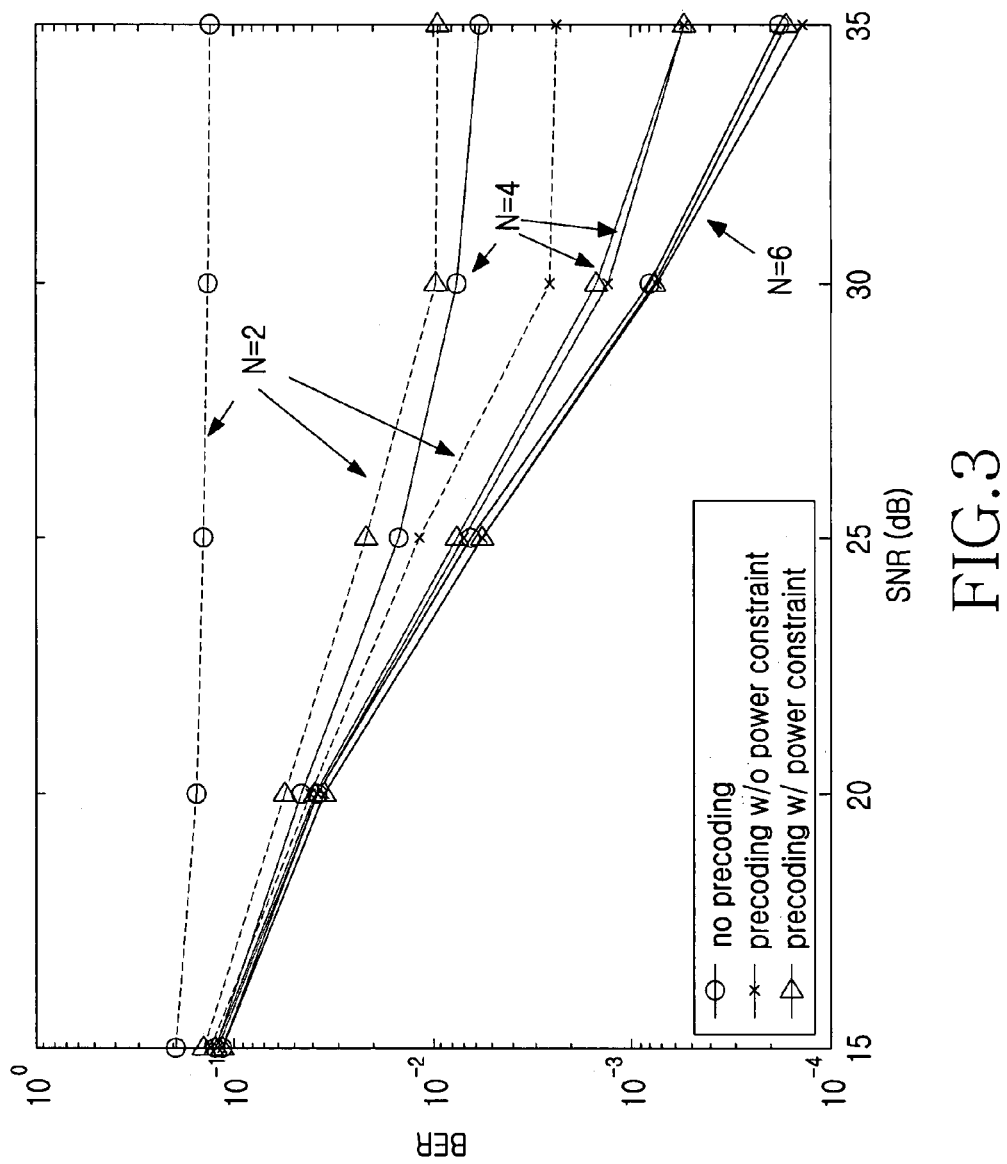
FIG. 3 is a graph illustrating a difference in performance between the conventional non-precoding scheme and a precoding scheme of the invention by using a Maximum Likelihood (ML) detection scheme in a 3 Km/h environment.

FIG. 3 is a graph illustrating a difference in performance between the conventional non-precoding scheme and a precoding scheme of the invention by using a Maximum Likelihood (ML) detection scheme in a 3 Km/h environment.

The simulation as shown in FIG. 3 was performed in under conditions as follows:

Carrier frequency and sampling rate: 2.3 GHz and 10 MHz, respectively;

1024 Fast Fourier Transform (FFT), 864 used sub-carriers, 96 DL pilot sub-carriers;

Frame length: 5 ms;

Channel model: Ped. B;

MIMO system: 2×2 antenna, transmission scheme: spatial multiplexing;

16 QAM, no channel coding;

downlink channel estimation scheme: a Minimum Mean Square Error (MMSE) estimator using a downlink pilot signal is used.

Further to the above conditions for the simulation, the uplink sub-channel includes two OFDM symbol periods, and one OFDM symbol period includes 27 sub-carriers. Therefore, it is assumed that N sub-carriers were from among the total 54 sub-carriers.

Figure 4:
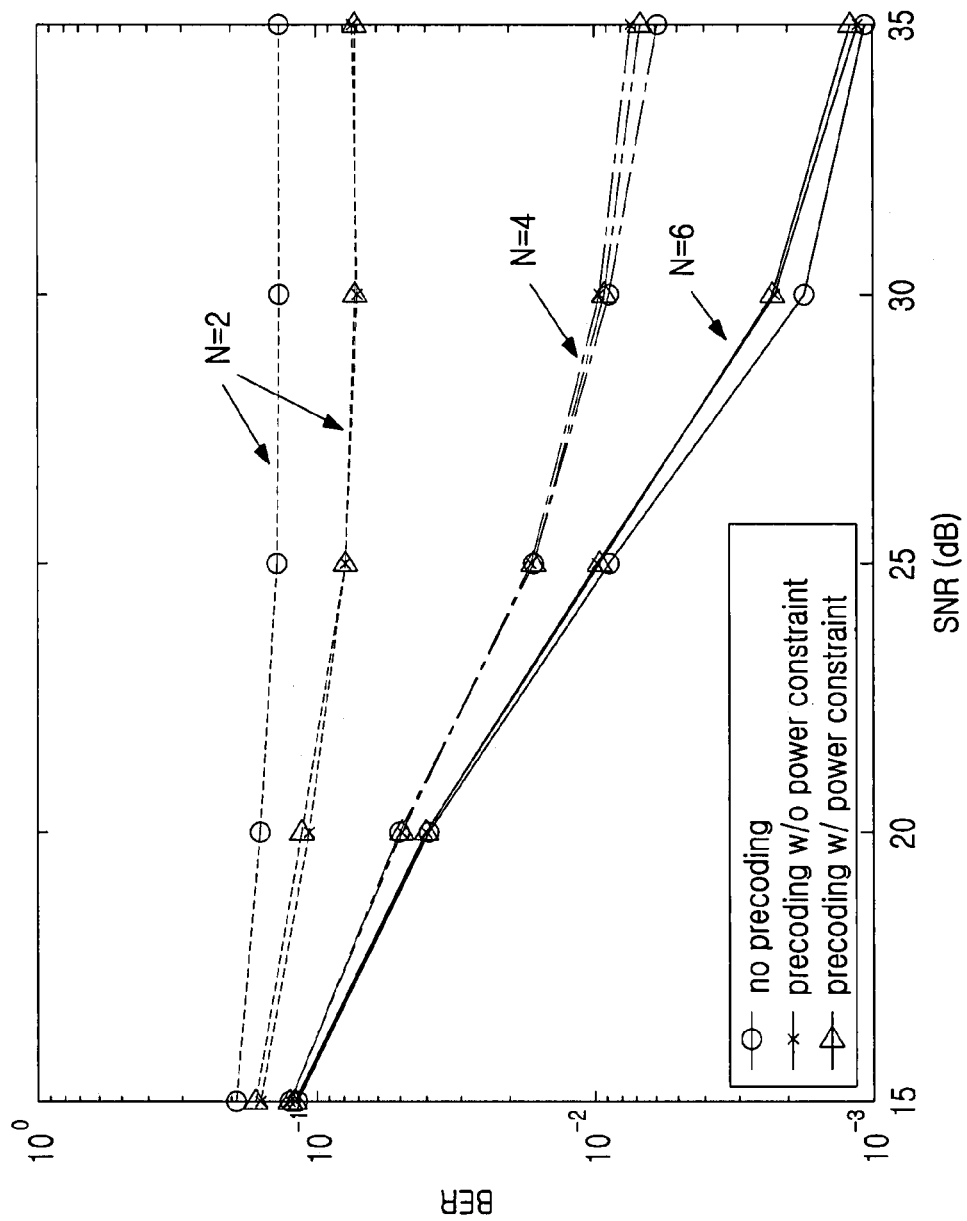
FIG. 4 is a graph illustrating a difference in performance between the conventional non-precoding scheme and a preceding scheme of the invention by using a Maximum Likelihood (ML) detection scheme in a 30 Km/h environment.

As noted from FIG. 3, from among the values of N (N=2, 4, or 6), the larger the N, the higher the signal detection performance. It is also noted that a method of the invention using precoding has a better Bit Error Rate (BER) performance than the conventional method that does not use the precoding. Further, as noted from FIG. 4, the present invention is robust against error even in a mobile environment of 30 km/h.

As described above, in a mobile communication system according to the present invention employing a precoding scheme, it is possible to achieve exact uplink channel estimation even with a small number of pilot signals. Further, use of a small number of pilot signals results in improvement in data transmission efficiency.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting an uplink signal by a mobile station in a mobile communication system using an Orthogonal Frequency Division Multiple Access (OFDMA) scheme, the method comprising the steps of:

estimating a downlink channel state by using a signal received from a base station;

determining a precoding matrix by using the estimated downlink channel state; and transmitting a signal obtained by multiplying an uplink signal to be transmitted by the precoding matrix to the base station;

wherein the precoding matrix is determined such that it allows a minimum difference between a channel estimation value of the estimated downlink channel state and an unlink channel estimation value to be estimated when the base station receives an uplink signal from the mobile station.

2. The method as claimed in claim 1, wherein estimation of the downlink channel state is performed by using at least one pilot signal included in the signal received from the base station.

3. The method as claimed in claim 1, wherein the mobile station assumes that the estimated downlink channel state is equal to an uplink channel state that has not been estimated.

4. The method as claimed in claim 1, wherein, when the precoding matrix is $W_k$, the downlink channel estimation value is $H_k$, and the uplink channel estimation value to be estimated by the base station is $\hat{H}_k$, the precoding matrix $W_k$ is defined by $$\min \|\hat{H}_k - H_k W_k\|_F^2,$$

wherein $\hat{H}_k$ denotes an uplink channel estimation value estimated by the mobile station when the base station estimates the uplink channel by using a $k^{th}$ sub-carrier, $H_k$ denotes a downlink channel estimation value corresponding to the $k^{th}$ sub-carrier, F refers to Frobenius norm, and a square of the Frobenius norm refers to a total of the squares of all elements of the matrix.

5. An apparatus for transmitting an uplink signal by a mobile station in a mobile communication system using an Orthogonal Frequency Division Multiple Access (OFDMA) scheme, the apparatus comprising:

a channel estimator for receiving a downlink signal from a base station, detecting a pilot signal from the received downlink signal, and estimating a down link channel state by using the detected pilot signal;

a precoding matrix determiner for determining a precoding matrix by using the estimated downlink channel state; and a precoder for transmitting a signal obtained by multiplying an uplink signal to be transmitted by the precoding matrix to the base station;

wherein the precoding matrix determiner determines the precoding matrix such that it allows a minimum difference between a channel estimation value of the estimated downlink channel state and an uplink channel estimation value to be estimated when the base station receives an unlink signal from the mobile station.

6. The apparatus as claimed in claim 5, wherein the channel estimator performs estimation of the downlink channel state by using at least one pilot signal included in the signal received from the base station.

7. The apparatus as claimed in claim 5, wherein the channel estimator performs estimation based on an assumption that the estimated downlink channel state is equal to an uplink channel state that has not been estimated.

8. The apparatus as claimed in claim 5, wherein, when the precoding matrix is $W_k$, the downlink channel estimation value is put as $H_k$, and the uplink channel estimation value to be estimated by the base station is $\hat{H}_k$, the precoding matrix $W_k$ is defined by $$\min\|\hat{H}_k - H_k W_k\|_F^2,$$

wherein $\hat{H}_k$ denotes an uplink channel estimation value estimated by the mobile station when the base station estimates the uplink channel by using $k^{th}$ sub-carrier, $H_k$ denotes a downlink channel estimation value corresponding to the $k^{th}$ sub-carrier, F refers to Frobenius norm, and a square of the Frobenius norm refers to the total of the squares of all elements of the matrix.

* * * * *